(12) United States Patent
Audette

(10) Patent No.: US 8,151,719 B2
(45) Date of Patent: Apr. 10, 2012

(54) MULTI CONFIGURATION DISTRIBUTION SYSTEM FOR A DRILL OR THE LIKE

(76) Inventor: Patrick Audette, Saint-Jude (CA)

( * ) Notice: Subject to any disclaimer, the term of this patent is extended or adjusted under 35 U.S.C. 154(b) by 0 days.

(21) Appl. No.: 13/155,721

(22) Filed: Jun. 8, 2011

(65) Prior Publication Data

US 2011/0232553 A1    Sep. 29, 2011

Related U.S. Application Data

(62) Division of application No. 12/457,974, filed on Jun. 26, 2009, now Pat. No. 7,980,187, which is a division of application No. 11/367,322, filed on Mar. 6, 2006, now Pat. No. 7,565,871.

(51) Int. Cl.
*A01C 7/00* (2006.01)
*A01C 9/00* (2006.01)

(52) U.S. Cl. .................. 111/900; 111/179; 111/186

(58) Field of Classification Search .............. 111/170, 111/171, 174–176, 183–188, 900, 921, 923, 111/925; 221/211
See application file for complete search history.

(56) References Cited

U.S. PATENT DOCUMENTS

| | | | |
|---|---|---|---|
| 5,592,889 | A | 1/1997 | Bourgault |
| 5,915,313 | A | 6/1999 | Bender et al. |
| 6,193,175 | B1 | 2/2001 | Andersson et al. |
| 6,267,067 | B1 | 7/2001 | Mayerle et al. |
| 6,845,724 | B2 | 1/2005 | Mayerle et al. |
| 6,854,405 | B2 | 2/2005 | Memory |
| 6,904,851 | B2 | 6/2005 | Memory |
| 6,928,938 | B2 | 8/2005 | Memory |
| 2005/0241070 | A1 | 11/2005 | Wake et al. |

*Primary Examiner* — Christopher J. Novosad
(74) *Attorney, Agent, or Firm* — Norton Rose Canada LLP

(57) ABSTRACT

A method of distributing at least one product on a ground surface with a drill having two sets of seeding units connected to a distribution system. A desired distribution pattern is selected between a separate pattern, where a first one of the at least one product is distributed through only the first sets of seeding units, and a mixed pattern, where the first product is distributed through both sets of seeding units. A distribution system is provided, defining a communication between the two sets of seeding units and a reservoir of the drill. When the separate pattern is selected, first and second sections of the distribution system are configured such that only the first section is in communication with the first set of seeding units, and the first product is received from the reservoir in the first section for distribution through only the first set of seeding units. When the mixed pattern is selected, the first and second sections are configured such that the first section is in communication with both sets of seeding units, and the first product is received from the reservoir in the first and second sections for simultaneous distribution through both sets of seeding units.

12 Claims, 6 Drawing Sheets

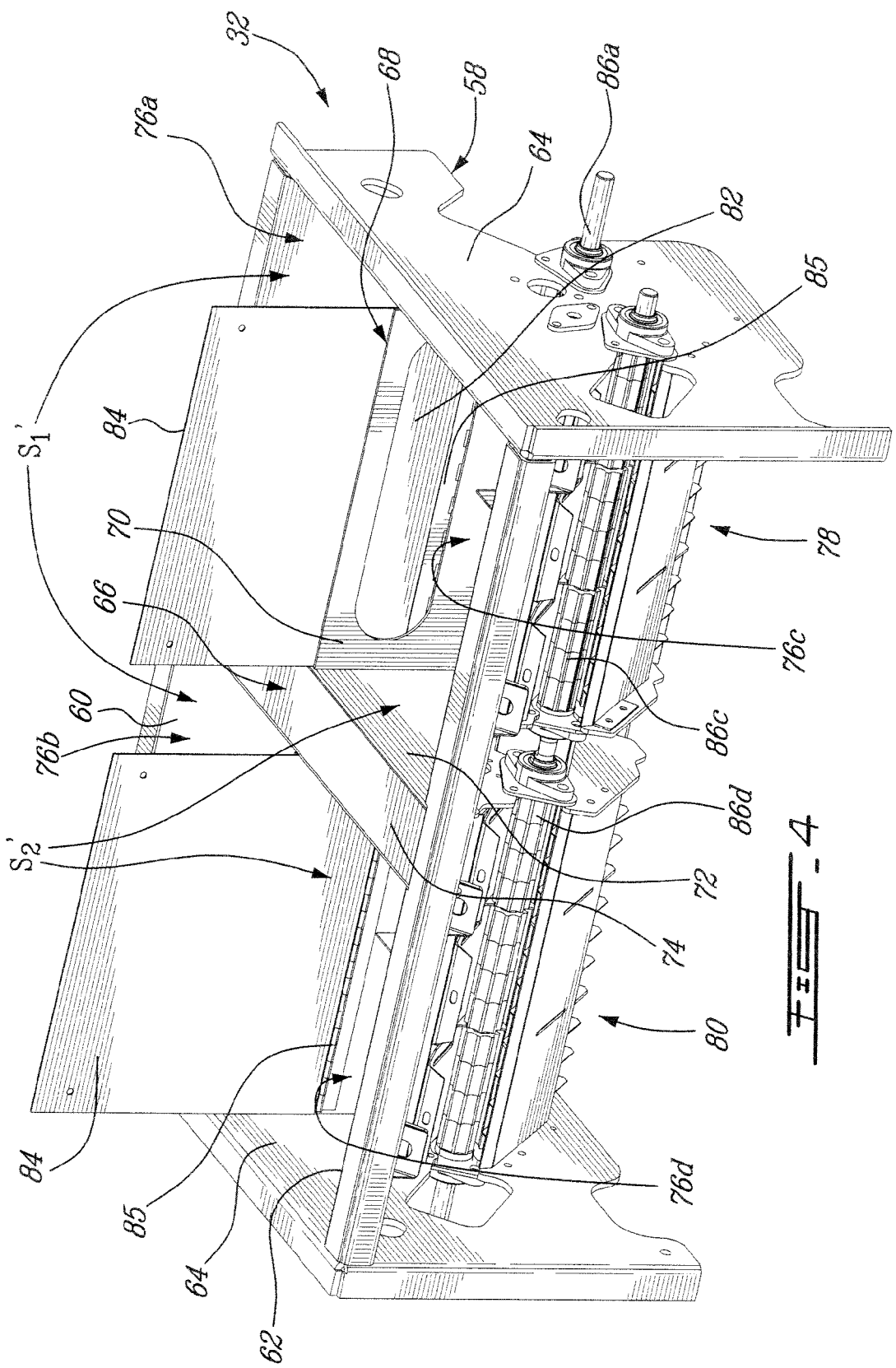

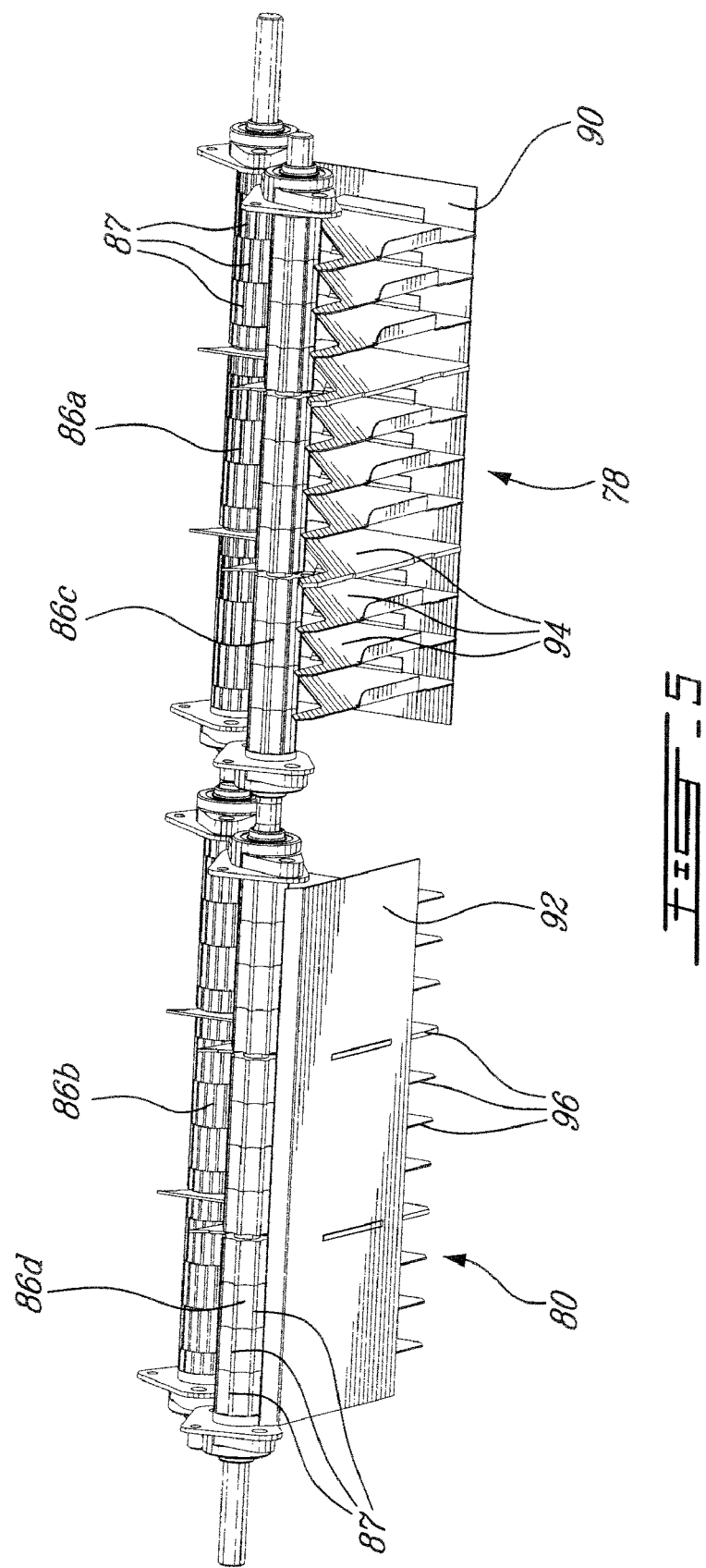

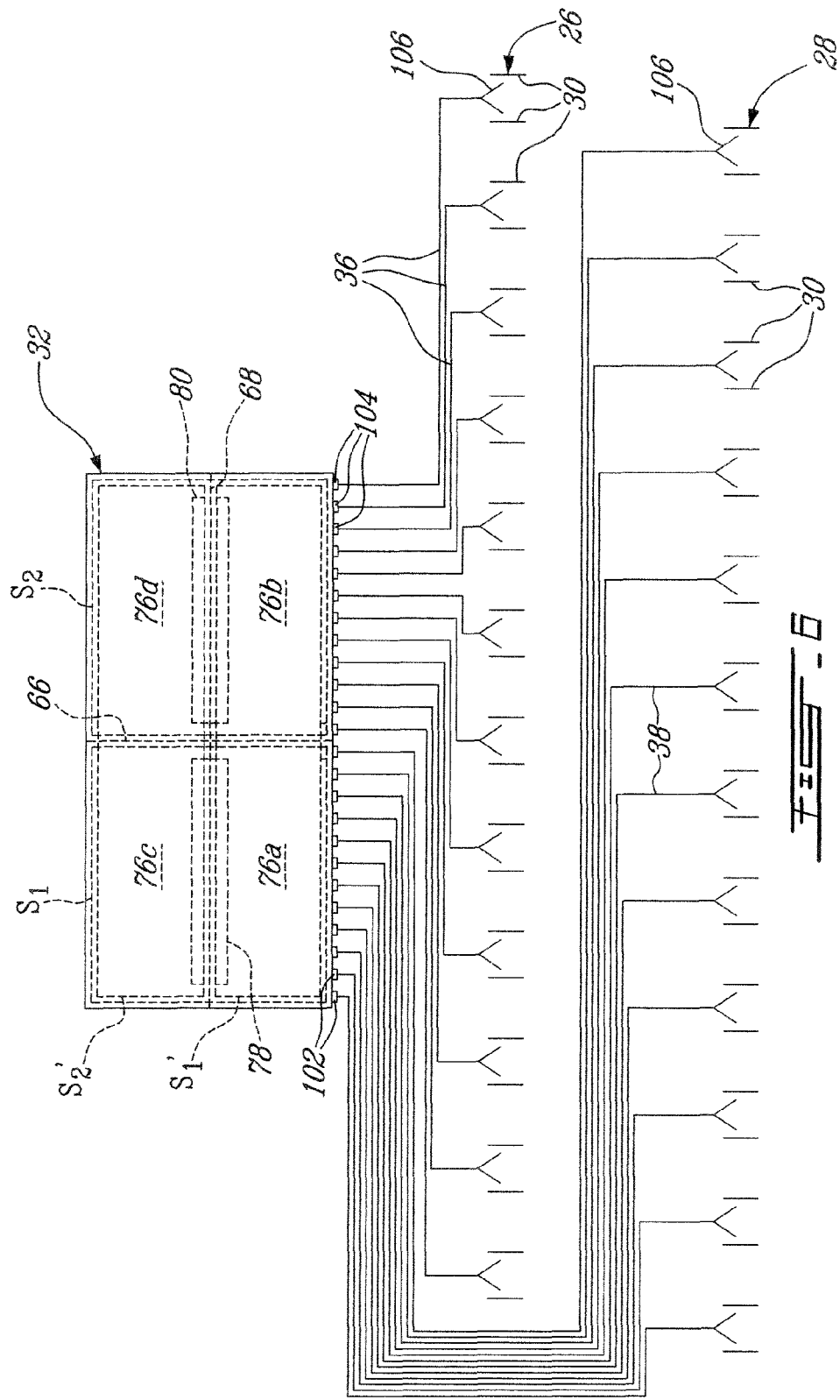

MULTI CONFIGURATION DISTRIBUTION SYSTEM FOR A DRILL OR THE LIKE

CROSS-REFERENCE TO RELATED APPLICATION

This application is a divisional of application Ser. No. 12/457,974 filed on Jun. 26, 2009, now U.S. Pat. No. 7,980,187, which is a divisional of application Ser. No. 11/367,322 filed on Mar. 6, 2006, now U.S. Pat. No. 7,565,871, both of which are incorporated by reference herein.

FIELD OF THE INVENTION

The present invention relates to agricultural equipment distributing granulate products, including seeds, and particularly to drills for distributing granulate products.

BACKGROUND ART

Some seeders or drills allow the simultaneous distribution of two or more granular products, for example seeds and a granular fertilizer, in a single pass. However, in most cases, the drills either distribute the two products in a mixed state or in separate rows, without being able to perform in the two configurations. Some farmers thus have to purchase two different types of seeders or drills.

Some prior art seeders or drills allow products from different tanks to selectively mix by having one conduit per product, with selectively openable and closable connections between the conduits such that the product from one conduit can be diverted into another conduit to be mixed with the product transported therein. The mixed products are thus generally delivered in a single conduit, while the separate products are delivered in several separate conduits. The use of different delivery systems for delivering separate and mixed products to the seeding units can render the seeder or drill relatively complex.

Other prior art seeders allow products from separate tanks, which can be distributed separately, to selectively mix in one of the tanks by opening a trap therebetween, such as to be distributed together. However, since the two products are mixed in the tank to be distributed together, the excess product which is not distributed cannot be individually recuperated and removed from the seeder. Moreover, here again different delivery systems are generally required for the separate and mixed product configurations.

Accordingly, improvements are desirable.

SUMMARY OF INVENTION

It is therefore an aim of the present invention to provide an improved drill and distribution method.

Therefore, in accordance with the present invention, there is provided a method of distributing at least one product on a ground surface with a drill having two sets of seeding units connected to a distribution system, the method comprising selecting a desired distribution pattern between a separate pattern, where a first one of the at least one product is distributed through only a first one of the sets of seeding units in spaced apart rows, and a mixed pattern, where the first product is distributed through both the sets of seeding units in spaced apart rows, providing a distribution system defining a communication between the two sets of seeding units and at least one reservoir of the drill containing the at least one product, when the separate pattern is selected, configuring first and second sections of the distribution system such that only the first section is in communication with the first one of the sets of seeding units, and receiving the first product from the reservoir in the first section for distribution through only the first one of the sets of seeding units, and when the mixed pattern is selected, configuring the first and second sections of the distribution system such that the first section is in communication with both the sets of seeding units, and receiving the first product from the reservoir in the first and second sections for simultaneous distribution through both the sets of seeding units.

BRIEF DESCRIPTION OF THE DRAWINGS

Reference will now be made to the accompanying drawings, showing by way of illustration a particular embodiment of the present invention and in which:

FIG. 4 is a front perspective view of the portion of the distribution system of FIG. 3, shown in a mixed configuration;

FIG. 5 is a front perspective view of metering rollers and distribution plates of the distribution system of FIG. 2; and FIG. 6 is a schematic representation of a delivery system and distribution system according to a particular embodiment of the present invention.

DETAILED DESCRIPTION OF PARTICULAR EMBODIMENTS

Figure 1:
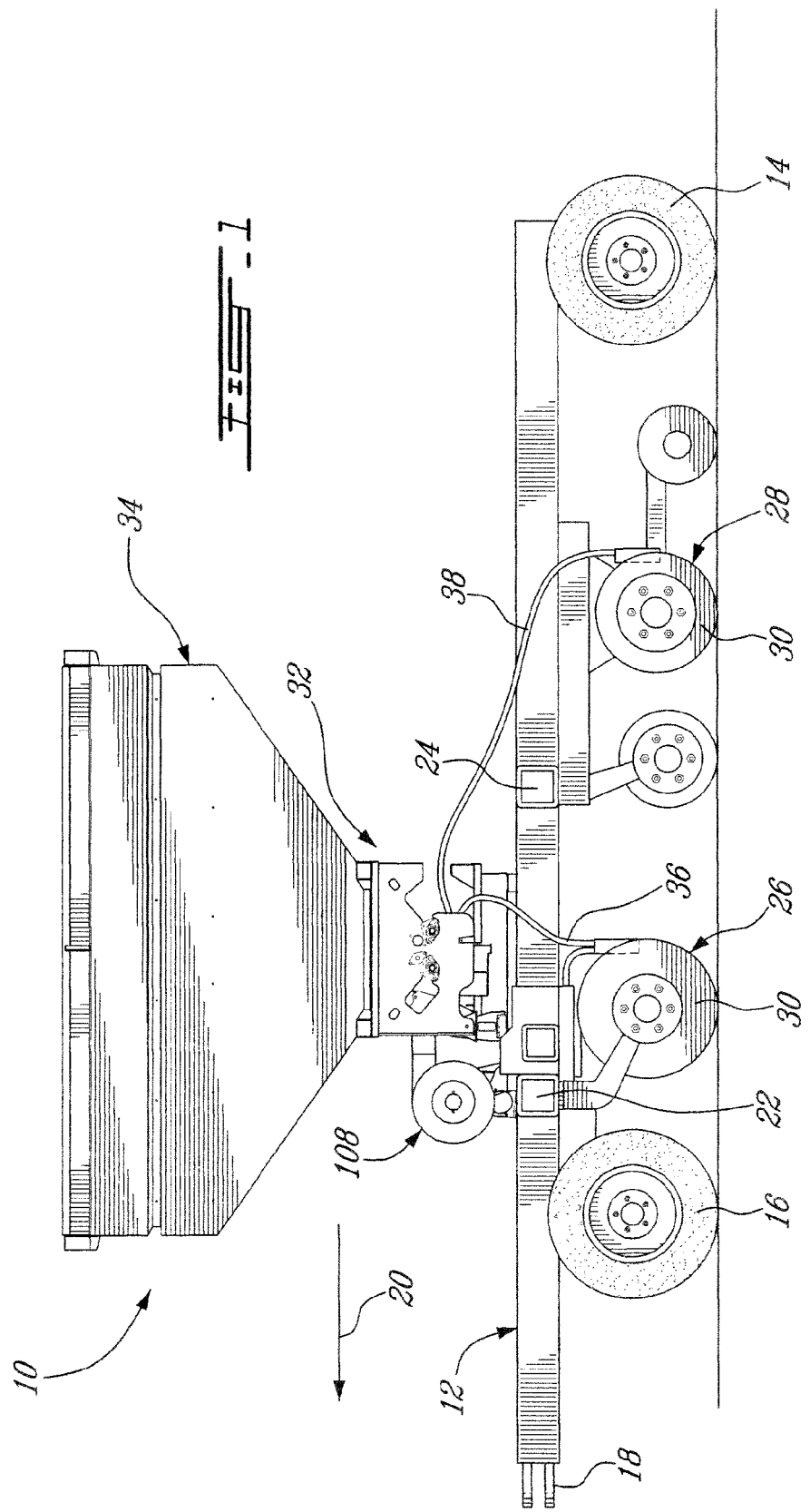
FIG. 1 is a side schematic view of a drill.

Referring to FIG. 1, the seed and fertilizer drill generally shown at 10 comprises a drill body 12 supported on the ground by a set of rear wheels 14 and a set of front wheels 16. In a particular embodiment, there are four (4) rear wheels 14 and two (2) front wheels 16, the front wheels 16 being pivotable, although any appropriate number of wheels and wheel configuration can alternately be used. The drill body 12 also includes a hitch pole 18 which is adapted to be connected to a tractor (not shown) for pulling the body 12 along a direction of travel 20. Alternately, the drill body 12 can be permanently attached to the tractor or to adequate alternate driving means.

The drill body 12 includes two transverse members 22, 24 extending substantially transversally to the direction of travel. Each transverse member 22, 24 supports a plurality of regularly laterally spaced apart seeding units 26, 28. The transverse members include a front transverse member 22 and a rear transverse member 24 which are spaced apart along the direction of travel 20, both transverse members 22, 24 being located between the front wheels 16 and the rear wheels 14. The front seeding units 26 of the front transverse member 22 and the rear seeding units 28 of the rear transverse members 24 are transversally offset with respect to one another, such that each but one of the rear seeding units 28 are aligned in between adjacent front seeding units 26, as can be seen in FIG. 6. In the embodiment shown, each transverse member 22, 24 supports twelve (12) seeding units 26, 28, although alternate number of seeding units, for example twenty-four (24), are also considered. Alternate configurations for the two transverse members 22, 24 are also considered.

Still referring to FIG. 1, each seeding unit 26, 28 includes two spaced apart seed openers 30 (see also FIG. 6), which can be for example disks, and is adapted to distribute at least one of seed and fertilizer in the furrow opened by each seed opener 30. Alternate types of seeding units can also be used, such as seeding units having a seed or fertilizer hopper mounted thereon, and/or shank blades as seed openers, and/or additional seed openers, etc.

The drill body 12 also supports a distribution system 32 on top of which a reservoir 34 is attached. In the embodiment shown, the distribution system 32 is located substantially over the front transverse member 22, although alternate locations are also considered. Flexible tubes 36, 38 extend between the distribution system 32 and the seeding units 26, 28, as will be further detailed below.

Figure 2:
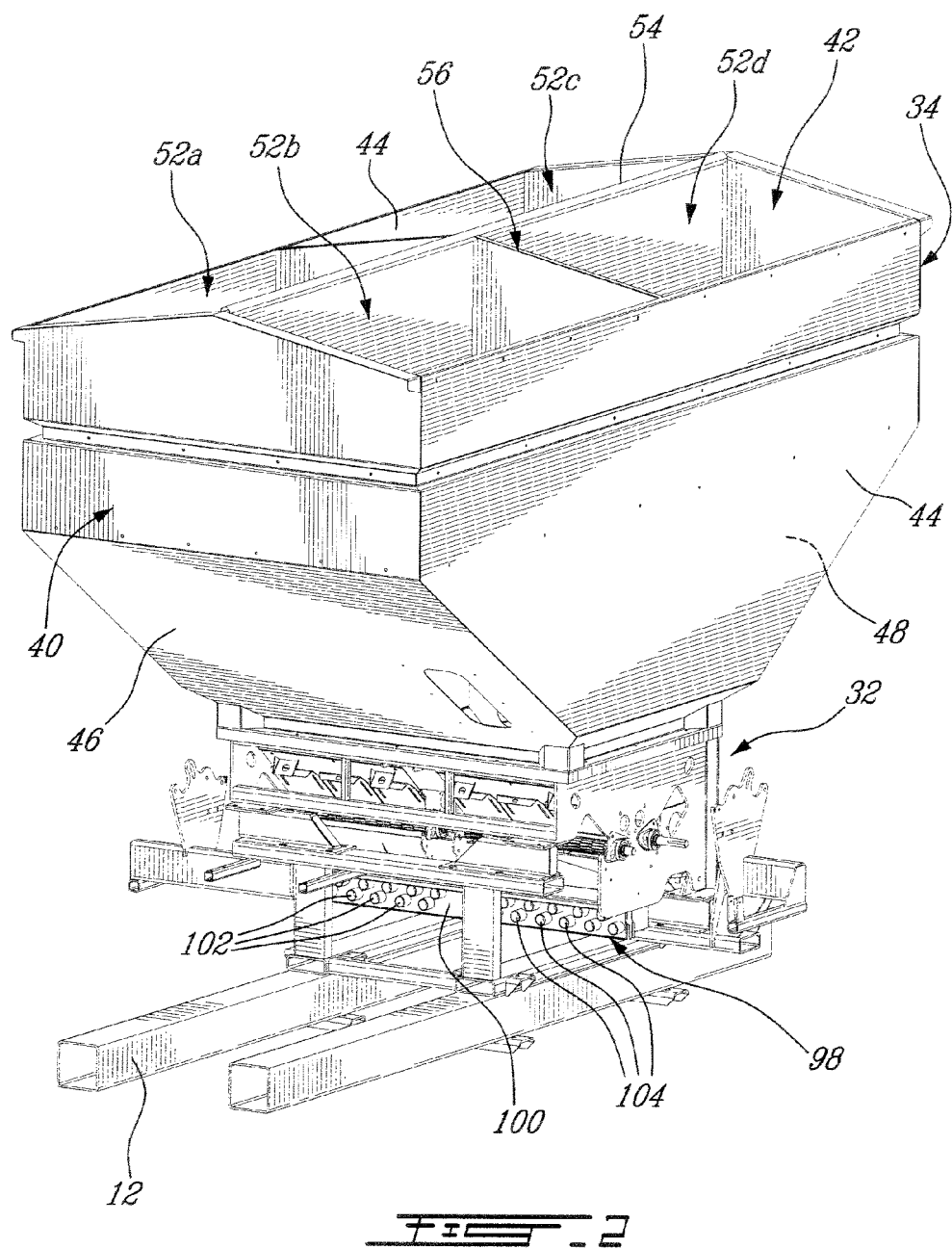
FIG. 2 is a rear perspective view of a reservoir of the drill of FIG. 1 connected to a distribution system according to a particular embodiment of the present invention.

Referring to FIG. 2, the reservoir 34 includes a rear wall 40, a front wall 42, and a pair of side walls 44 interconnecting the rear and front walls 40, 42. The reservoir 34 has an open top for loading and has an open bottom which provides a communication between the reservoir 34 and the distribution system 32. A bottom portion 46 of the rear wall 40 and a bottom portion 48 of the front wall 42 are angled toward each other such as to provide a somewhat conical shape for the reservoir 34, thus facilitating the distribution of the reservoir content into the distribution system 32 underneath. Alternate geometries for the reservoir 34 are also considered.

The reservoir 34 defines an enclosure which is separated into four (4) containers 52a,b,c,d by a longitudinal partition wall 54 extending from the front wall 42 to the rear wall 40 between the two side walls 44 and a transversal partition wall 56 formed of two aligned wall portions each extending from one of the side walls 44 to the longitudinal wall 54 in between the rear and front walls 40, 42. In the embodiment shown, the containers 52a,b,c,d are equal in size, and the longitudinal and transversal walls 54, 56 are fixedly attached to the reservoir 34. Alternately, the containers 52a,b,c,d can be of different sizes, and/or one or both of the longitudinal and transversal walls 54, 56 can be removable. The reservoir 34 can also be replaced by a plurality of separate containers.

Figure 3:
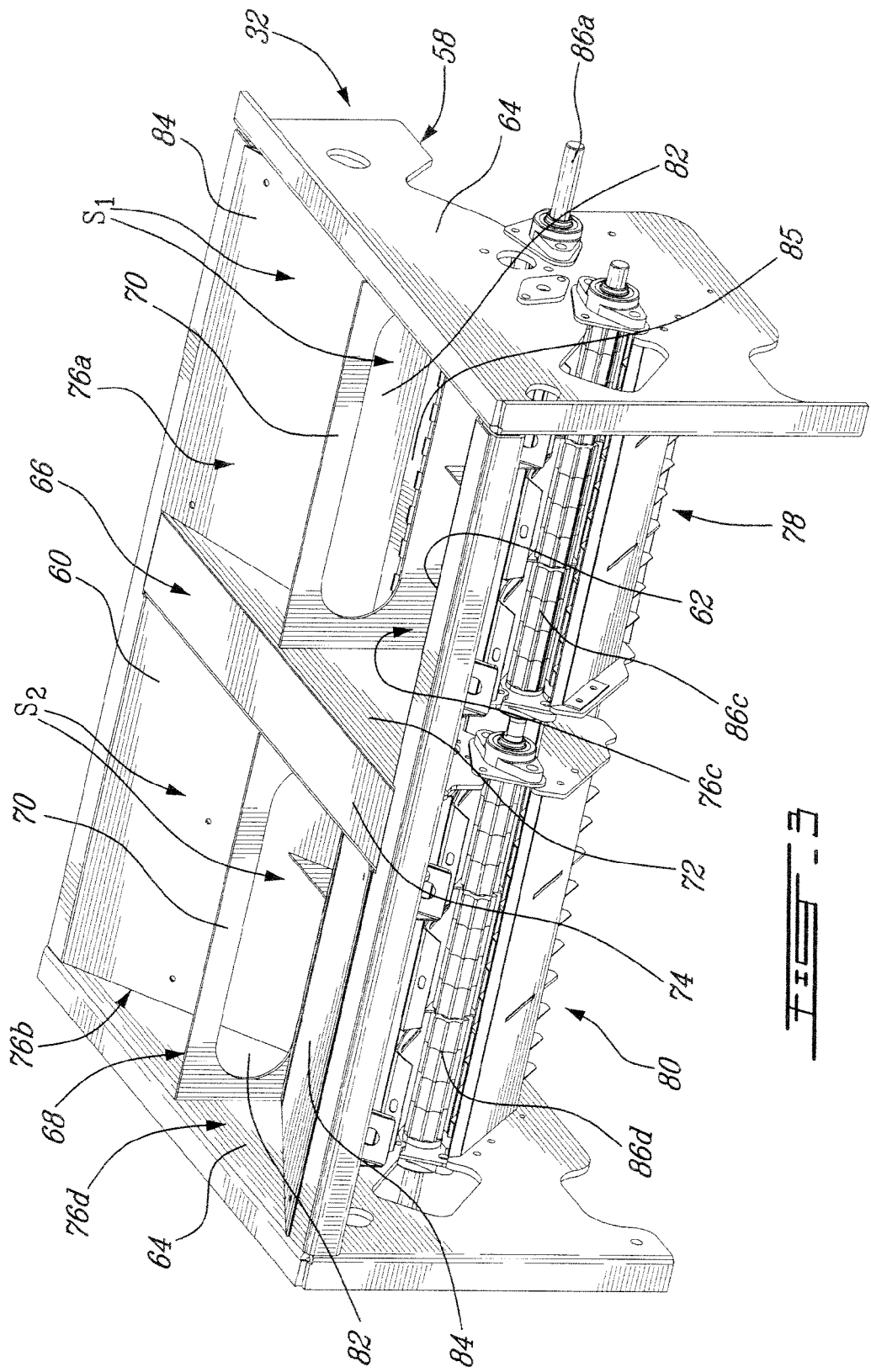
FIG. 3 is a front perspective view of a portion of the distribution system of FIG. 2, shown in a separate configuration.

Referring to FIGS. 3 and 4, the distribution system 32 includes a body 58 formed of a front wall 62 and a rear wall 60 which are angled toward each other such as to be closer at a bottom of the body 58, and side walls 64 which interconnect the rear and front walls 60, 62, thus defining a receptacle therebetween. The receptacle is in communication with the reservoir 34 through the open bottom end thereof. The distribution system 32 also includes a longitudinal partition wall 66 which extends from the front wall 62 to the rear wall 60 between the two side walls 64, and a transversal partition wall 68 which is formed of two panels 70, one panel 70 extending between each of the side walls 64 and the longitudinal wall 66. The longitudinal wall 66 includes two spaced apart vertical panels 72 which are interconnected along a top edge thereof by a top panel 74. The longitudinal wall 66 and the transversal wall 68 separate the receptacle into four (4) containment units 76a,b,c,d, with the longitudinal walls 54, 66 and transversal walls 56, 68 of the reservoir 34 and the distribution system 32 being respectively aligned, such that each containment units 76a,b,c,d is in communication with a single respective one of the containers 52a,b,c,d defined in the reservoir 34.

The body 58 also defines two outlets 78, 80 at a bottom thereof, a first outlet 78 being defined by a free space between the rear and front walls 60, 62 on a first side of the longitudinal wall 66, and a second outlet 80 being defined by a similar free space between the rear and front walls 60, 62 on a second side of the longitudinal wall 66.

The two panels 70 of the transversal wall 68 of the distribution system 32 each include an opening 82 defined therein such as to provide communication between the containment units located on a same side of the longitudinal wall 66, i.e. units 76a,c and units 76b,d. A cover 84 is pivotally connected to each panel 70 by a hinge 85 extending underneath the opening 82, and is pivotable between a first position where the cover 84 completely blocks the opening 82 and as such the communication between the corresponding containment units 76a,c and 76b,d (see FIG. 4), and a second position where the cover 84 rests away from the opening 82, leaving it unobstructed (see FIG. 3). Thus, the longitudinal and transversal walls 66, 68, together with the covers 84, form separation means that can separate the receptacle in a selected one of a separate configuration and a mixed configuration, as will be explained further below.

In the separate configuration, shown in FIG. 3 and corresponding to the covers 84 pivoted such as to leave the openings 82 unobstructed, the receptacle is separated in two main separate sections $S_1$, $S_2$, each being formed of the two containment units on a same side of the longitudinal wall 66 which are in communication with one another through the corresponding opening 82, i.e. one section $S_1$ is formed of containment units 76a,c and one section $S_2$ is formed of containment units 76b,d. In that separate configuration, each section $S_1$, $S_2$ is in communication with a single one of the outlets 78, 80, such that each outlet 78, 80 lets through the product contained in a single section $S_1$, $S_2$.

In the mixed configuration, shown in FIG. 4 and corresponding to the covers 84 pivoted such as to block the openings 82, the two separate sections $S_1'$, $S_2'$ of the receptacle are each formed of the containment units on a same side of the transversal wall, i.e. one section $S_1'$ is formed of containment units 76a,b and one section $S_2'$ is formed of containment units 76c,d. In that mixed configuration, each section $S_1'$, $S_2'$ is in communication with both outlets 78, 80, such that each outlet 78, 80 lets through the product contained in both sections $S_1'$, $S_2'$ in a mixed manner.

In an alternate embodiment, the longitudinal wall 66 also include openings (not shown) which are covered in the separate configuration and left unobstructed in the mixed configuration. The longitudinal wall 66 can also be removable in the mixed configuration and/or the transversal wall 68 be removable in the separate configuration. Other alternate geometries are also possible.

As can be best seen in FIG. 5, the distribution system 32 further comprises a metering roller 86a,b,c,d located in each containment unit 76a,b,c,d upstream of the corresponding outlet 78, 80 for directing the product from the containment units 76a,b,c,d through the outlets 78, 80 at a selected rate, the metering rollers 86a,b,c,d being driven to rotate by adequate driving means (not shown). Each metering roller 86a,b,c,d has a series of axial grooves 87 defined therein, with a spacing between the grooves 87, a of grooves 87 and a speed of rotation of the roller 86a,b,c,d being selected according to the product to be metered and the desired flow rate. The metering rollers on a same side of the transversal wall 68, i.e. rollers 86a,b and rollers 86c,d, are keyed to each other such as to rotate together in order to minimize the number and complexity of necessary roller driving means.

Thus, in the mixed configuration, the keyed metering rollers 86a,b and 86c,d extend across a same section $S_1'$, $S_2'$ (see FIG. 4) and as such meter a same product. However, in the separate configuration, the keyed metering rollers 86a,b and 86c,d extend across different sections $S_1$, $S_2$ (see FIG. 3) and as such would meter different products, which can be undesirable since typically different products require the metering rollers to be adjusted differently and separately because of product size, weight, desired distribution flow, etc. To prevent this, and as shown in FIG. 3, in the separate configuration, the covers 84 which pivot away from the openings come to rest upon, respectively, the rear wall 60 in one section $S_1$, and the front wall 62 in the other section $S_2$, and form a bottom wall in one containment unit per section, unit 76a for section $S_1$ and unit 76d for section $S_2$. As such, the covers 84 need to be sufficiently strong to act as a bottom wall for the respective section, and can include reinforcing means (not shown) attached thereon when necessary. The bottom wall formed by each cover 84 extends over the metering roller 86a,d of that containment unit 76a,d, preventing that metering roller 86a,d from interacting with the product and directing the product falling in that containment unit 76a,d to the other containment unit 76b,c of the same section through the opening 82 in the corresponding panel 70. As such, in the separate configuration, a single metering roller meters the product contained in each section, i.e. roller 86c in section $S_1$ and roller 86b in section $S_2$. The metering rollers in function 86b,c are located on opposite sides of the transversal wall 68, such as to have only one metering roller in each pair of keyed metering roller 86a,b and 86c,d in function.

Alternate means can be used to ensure that two keyed rollers will not meter different products, for example by having each metering roller 86a,b,c,d independently driven, or by having the metering rollers 86a,b and 86c,d on a same side of the transversal wall 68 only keyed together in the mixed configuration and detached from one another in the separate configuration, for example by using a transmission system, etc.

Referring back to FIG. 5, the distribution system 32 also includes in each outlet 78, 80, and extending underneath the two metering rollers 86a,c and 86b,d associated with that outlet 78, 80 a distribution plate 90, 92 which forms a downward slope towards the rear of the body 58 for receiving and guiding the product coming off the metering rollers 86a,c and 86b,d. Attached to and extending from each distribution plate 90, 92 is a series of spaced apart dividers 94, 96, which divide the flow of product into several streams, one stream per seeding unit 26, 28 of one of the transversal members 22, 24.

Referring to FIG. 2, the drill 10 also includes a delivery system 98, which comprises a distribution box 100 located under the distribution plates 90, 92 and receiving each stream of the separated flow of product passing between the dividers 94, 96 into a separate section (not shown). An exit port 102, 104 is formed in each section. As schematically shown in FIG. 6, a flexible tube 36, 38 interconnects each exit port 102, 104 to one of the seeding units 26, 28, the exit ports 102 corresponding to one outlet 78 being connected to the rear seeding units 28 and the exit ports 104 corresponding to the other outlet 80 being connected to the front seeding units 26. The free end of each flexible tube 36, 38 is connected to dividing means 106 which divide the product coming from each flexible tube 36, 38 into two streams, one stream being deposited in proximity of each seed opener 30.

A pneumatic system, including blowers 108 (see FIG. 1) producing air pressure in the distribution box 100 or another equivalent means, pushes the product in each section of the box 100 through the corresponding exit port 102, 104 and flexible tube 36, 38 up to the corresponding seeding unit 26, 28.

Thus, in the separate configuration, one section $S_1$ is in communication with only the rear seeding units 28 through a single outlet 78, and the other section $S_2$ is in communication with only the front seeding units 26 through the other outlet 80. As such, the product contained in each of the sections $S_1$, $S_2$ is only distributed by the seeding units of a corresponding one of the transverse members 22, 24. This configuration is especially advantageous for seeds requiring a wider spacing in between adjacent rows, as well as with seeds that cannot be directly combined with another product to be distributed, such as a granular fertilizer, in that it allows the seeds contained in one section to be distributed by the seeding units of one transverse member and the other product contained in the other section to be distributed by the seeding units of the other transverse member such as to form alternating rows, i.e. a row of the other product in between adjacent rows of seeds. In a particular embodiment, seeds are received in section $S_1$ and distributed by the rear seeding units 28, while granular fertilizer is received in section $S_2$ and distributed by the front seeding units 26.

In a case where the distribution system 32 is not used to distribute another product (i.e. either no other product is distributed or the other product is otherwise distributed, for example through individual systems integrated to the seeding units) the seeding units of one of the members, for example front seeding units 26, are disengaged from the ground and the distribution system 32 receives seeds in the section corresponding to the seeding units of the active member only, for example section $S_1$ for the rear seeding units 28, the unused section $S_2$ and corresponding containers 52b,d of the reservoir 34 being left empty. Alternately, the unused section $S_2$ and corresponding containers 52b,d of the reservoir 34 can be filled with seeds and the seeds prevented from leaving the unused section $S_2$, for example by blocking the corresponding exit ports 104.

In the mixed configuration, the two sections $S_1'$, $S_2'$ are each in communication with the seeding units 26, 28 of both transverse members 22, 24 through both outlets 78, 80. As such, the product contained in each of the sections $S_1'$, $S_2'$ is distributed by both the front and rear seeding units 26, 28. This configuration is especially advantageous for seeds requiring a narrower spacing in between adjacent rows, and with seeds that can be directly combined with another product to be distributed, for example granular fertilizer, in that it allows the seeds contained in one section to be distributed simultaneously with another product contained in the other section through the seeding units of both members, such as to form rows containing both seeds and the other product together. In a particular embodiment, seeds are received in section $S_1'$ and distributed by all the seeding units 26, 28, and granular fertilizer is received in section $S_2'$ and distributed by all the seeding units 26, 28 as well.

In a case where the distribution system is not used to distribute another product (i.e. either no other product is distributed or the other product is otherwise distributed, for example through individual systems integrated to the seeding units) the whole reservoir 34 can be filled with seeds such that seeds are received in both sections $S_1'$, $S_2'$ to be distributed by the front and rear seeding units 26, 28.

Thus, in use, when two different products need to be distributed, a desired distribution pattern for the two products is selected between a separate pattern, where the two products are distributed in separate spaced apart rows, and a mixed pattern, where the two products are distributed together in the same rows. The configuration of the distribution system 32 is than set accordingly, i.e. by configuring the distribution system 32 in the separate configuration for a separate distribution pattern or in the mixed configuration for a mixed distribution pattern. The two products are poured into the containers 52a,b,c,d of the reservoir 34 aligned with the two sections of the chosen configuration. For example, for a separate configuration, the first product is poured in containers 52a,c (section $S_1$) and the second product is poured in containers 52b,d (section $S_2$). The two products can then be distributed on the field according to the selected distribution pattern.

In a particular embodiment, a spacing between adjacent front seeding units 26 is the same as a spacing between adjacent rear seeding units 28 and is approximately 15 inches, and the front seeding units 26 are centered between the rear seeding units 28 such as to have approximately 7.5 inches between each front seeding unit 26 and the adjacent rear seeding units 28. As such, the drill 10 can alternately distribute seeds in rows 7.5 inches apart with or without another product combined with the seeds (mixed configuration), or in rows 15 inches apart with or without rows of another product in between adjacent rows of seeds (separate configuration).

The embodiments of the invention described above are intended to be exemplary. Those skilled in the art will therefore appreciate that the foregoing description is illustrative only, and that various alternate configurations and modifications can be devised without departing from the spirit of the present invention. Accordingly, the present invention is intended to embrace all such alternate configurations, modifications and variances which fall within the scope of the appended claims.

The invention claimed is:

1. A method of distributing at least one product on a ground surface with a drill having two sets of seeding units connected to a distribution system, the method comprising:
   selecting a desired distribution pattern between a separate pattern, where a first one of the at least one product is distributed through only a first one of the sets of seeding units in spaced apart rows, and a mixed pattern, where the first product is distributed through both the sets of seeding units in spaced apart rows;
   providing a distribution system defining a communication between the two sets of seeding units and at least one reservoir of the drill containing the at least one product;
   when the separate pattern is selected, configuring first and second sections of the distribution system such that only the first section is in communication with the first one of the sets of seeding units, and receiving the first product from the reservoir in the first section for distribution through only the first one of the sets of seeding units; and
   when the mixed pattern is selected, configuring the first and second sections of the distribution system such that the first section is in communication with both the sets of seeding units, and receiving the first product from the reservoir in the first and second sections for simultaneous distribution through both the sets of seeding units.

2. The method according to claim 1, wherein the at least one product also includes a second product being distributed through only the second set of seeding units when the separate pattern is selected and through the first and second sets of seeding units together with the first product when the mixed pattern is selected, and the method further comprising:
   when the separate pattern is selected, configuring the first and second sections of the distribution system such that only the second section is in communication with the second one of the sets of seeding units, and receiving the second product from the at least one reservoir in only the second section for distribution through only the second one of the sets of seeding units; and
   when the mixed pattern is selected, configuring the first and second sections of the distribution system such that the second section is in communication with both the sets of seeding units, and receiving the second product from the reservoir in the first and second sections together with the first product for simultaneous distribution through both the sets of seeding units.

3. The method according to claim 2, wherein the two sets of seeding units are spaced apart along a direction of travel and offset along a direction transverse to the direction of travel such that each but one seeding unit of the first one of the sets is aligned between adjacent seeding units of the second one of the sets, such that the spaced apart rows of the separate pattern are alternating rows of the first and second products.

4. The method as defined in claim 2, comprising independently metering the first and second products from the distribution system to the two sets of seeding units.

5. The method according to claim 2, wherein the distribution system includes first and second containment units in communication with only the first one of the sets of seeding units and third and fourth containment units in communication with only the second one of the sets of seeding units, and wherein:
   when the mixed pattern is selected, configuring the first and second sections of the distribution system includes providing communication between the first and third containment units such that the first and third containment units together define the first section receiving the first product, and providing communication between the second and fourth containment units such that the second and fourth containment units together define the second section receiving the second product; and
   when the separate pattern is selected, configuring the first and second sections of the distribution system includes preventing communication between the first containment unit and any one of the third and fourth containment units and preventing communication between the second containment unit and any one of the third and fourth containment units such that the first and second containment units together define the first section receiving the first product, and the third and fourth containment units together define the second section receiving the second product.

6. The method according to claim 5, wherein the four containment units are defined by first and second intersecting walls, and wherein:
   when the mixed pattern is selected, providing communication between the first and third containment units includes uncovering a first opening defined through the first wall on one side of the second wall and providing communication between the second and fourth containment units includes uncovering a second opening defined through the first wall on the other side of the second wall; and
   when the separate pattern is selected, preventing communication between the first containment unit and any one of the third and fourth containment units and between the second containment unit and any one of the third and fourth containment units includes closing the first and second openings.

7. The method as defined in claim 2, further comprising using a pneumatic system to circulate the at least one product from the distribution system to the seeding units.

8. The method according to claim 1, wherein the at least one product includes only the first product, the method further comprising, when the separate pattern is selected, receiving the first product from the reservoir in the second section, and closing a communication between the second section and the second one of the sets of seeding units.

9. The method according to claim 1, wherein the at least one product includes only the first product, the method further comprising, when the separate pattern is selected, disengaging the second one of the sets of seeding units from the ground such that the second one of the sets of seeding units remains unused during the distribution of the first product.

10. The method according to claim 1, wherein the distribution system includes first and second containment units in communication with only the first one of the sets of seeding units and third and fourth containment units in communication with only the second one of the sets of seeding units, and wherein:
when the mixed pattern is selected, configuring the first and second sections of the distribution system includes providing communication between the first and third containment units such that the first and third containment units together define the first section, and providing communication between the second and fourth containment units such that the second and fourth containment units together define the second section; and
when the separate pattern is selected, configuring the first and second sections of the distribution system includes preventing communication between the first containment unit and any one of the third and fourth containment units and preventing communication between the second containment unit and any one of the third and fourth containment units such that the first and second containment units together define the first section, and the third and fourth containment units together define the second section.

11. The method according to claim 10, wherein the four containment units are defined by first and second intersecting walls, and wherein:
when the mixed pattern is selected, providing communication between the first and third containment units includes uncovering a first opening defined through the first wall on one side of the second wall and providing communication between the second and fourth containment units includes uncovering a second opening defined through the first wall on the other side of the second wall; and
when the separate pattern is selected, preventing communication between the first containment unit and any one of the third and fourth containment units and between the second containment unit and any one of the third and fourth containment units includes closing the first and second openings.

12. The method as defined in claim 1, further comprising using a pneumatic system to circulate the at least one product from the distribution system to the seeding units.

* * * * *